(12) United States Patent
Gaertner et al.

(10) Patent No.: US 10,086,849 B2
(45) Date of Patent: Oct. 2, 2018

(54) VEHICLE, IN PARTICULAR RAIL VEHICLE, WITH A COMPRESSED AIR-OPERATED TOILET DEVICE

(71) Applicant: SIEMENS AKTIENGESELLSCHAFT, Munich (DE)

(72) Inventors: Ralph Gaertner, Brueggen (DE); Walter Lindermuth, Nieukerk (DE); Gerd Talarowski, Poxdorf (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 15/111,607

(22) PCT Filed: Dec. 15, 2014

(86) PCT No.: PCT/EP2014/077700
§ 371 (c)(1),
(2) Date: Jul. 14, 2016

(87) PCT Pub. No.: WO2015/106897
PCT Pub. Date: Jul. 23, 2015

(65) Prior Publication Data
US 2016/0332641 A1   Nov. 17, 2016

(30) Foreign Application Priority Data
Jan. 14, 2014   (DE) .................. 10 2014 200 485

(51) Int. Cl.
*B61D 35/00*   (2006.01)
*B60G 11/27*   (2006.01)
(Continued)

(52) U.S. Cl.
CPC ............ *B61D 35/005* (2013.01); *B60G 11/27* (2013.01); *B61D 35/00* (2013.01); *B61D 49/00* (2013.01);
(Continued)

(58) Field of Classification Search
CPC ... E03D 3/10; B61D 35/005; Y10T 137/3127; B60G 11/27
See application file for complete search history.

(56) References Cited

U.S. PATENT DOCUMENTS 1,889,120 A   11/1932   Donovan
4,170,048 A   10/1979   Anthony
(Continued)

FOREIGN PATENT DOCUMENTS

AU   502550 B2   8/1979
CN   203332128 U   12/2013
(Continued)

*Primary Examiner* — Kevin Murphy
(74) *Attorney, Agent, or Firm* — Laurence Greenberg; Werner Stemer; Ralph Locher (57) ABSTRACT

A vehicle, in particular a rail vehicle, includes a compressed-air-operated toilet device and a compressed air supply system which supplies compressed air to the toilet device during normal operation. The vehicle also includes an emergency compressed air source that is suitable for providing compressed air for continued operation of the toilet device in the event of a failure of the compressed air supply system.

14 Claims, 5 Drawing Sheets

(51) Int. Cl.
  *B61D 49/00*    (2006.01)
  *B61F 5/10*    (2006.01)
  *B61F 99/00*    (2006.01)
  *E03D 3/10*    (2006.01)

(52) U.S. Cl.
  CPC ............... *B61F 5/10* (2013.01); *B61F 99/00* (2013.01); *E03D 3/10* (2013.01); *B60G 2800/80* (2013.01); *Y10T 137/3127* (2015.04)

(56) References Cited

U.S. PATENT DOCUMENTS

| | | | | |
|---|---|---|---|---|
| 4,199,828 | A | | 4/1980 | Hellers |
| 5,363,513 | A | * | 11/1994 | Blankenburg ............ E03D 3/10 4/354 |
| 6,977,005 | B2 | * | 12/2005 | Erdmann ............... B64D 11/02 4/316 |
| 8,615,822 | B2 | * | 12/2013 | Vargas ..................... E03D 1/08 4/329 |
| 9,139,994 | B2 | * | 9/2015 | Dannenberg ........... B64D 11/02 |
| 9,611,627 | B2 | * | 4/2017 | Schreiner ............... B64D 11/02 |
| 2010/0050330 | A1 | * | 3/2010 | Earlywine ................ E03D 3/10 4/321 |
| 2011/0004990 | A1 | * | 1/2011 | Leitao ..................... E03D 5/10 4/328 |

FOREIGN PATENT DOCUMENTS

| | | | | |
|---|---|---|---|---|
| DE | 2231300 | A1 | | 1/1974 |
| DE | 2902476 | A1 | | 7/1979 |
| DE | 102011109943 | A1 | * | 2/2013 ............. B64D 11/02 |
| EP | 0584031 | A2 | | 2/1994 |

* cited by examiner

VEHICLE, IN PARTICULAR RAIL VEHICLE, WITH A COMPRESSED AIR-OPERATED TOILET DEVICE

BACKGROUND OF THE INVENTION

Field of the Invention

The invention relates to a vehicle, in particular a rail vehicle having a compressed-air-operated toilet device and a compressed air supply system which during normal operation supplies the toilet device with compressed air.

In the field of rail technology, toilet devices are generally operated with compressed air and to this end are supplied with compressed air from a central compressed air supply system. For intermediate storage of compressed air, the toilet devices are generally provided with compressed air containers which are connected to the compressed air supply system.

BRIEF SUMMARY OF THE INVENTION

An object of the invention is to provide vehicles, in particular rail vehicles, in which the toilet devices can continue to be operated for longer than with previous vehicles in the event of a failure of the compressed air supply system.

This object is achieved according to the invention by a vehicle having a compressed-air-operated toilet device, a compressed air supply system which during normal operation supplies the toilet device with compressed air as well as the features described below. Advantageous embodiments of the vehicle according to the invention are set out in dependent claims.

Accordingly, there is provision according to the invention for the vehicle to have an emergency compressed air source which is suitable, in the event of a failure of the compressed air supply system, for providing compressed air for the continued operation of the toilet device.

A significant advantage of the vehicle according to the invention can been seen in that, as a result of the emergency compressed air source provided according to the invention, continued operation of the toilet device is possible—at least for a specific time—even when the compressed air supply system of the vehicle has failed.

It is considered to be particularly advantageous for the vehicle to have, in order to provide the air suspension of the vehicle, an air suspension device which is connected indirectly or directly to the toilet device and for the vehicle to have a control device which is configured in such a manner that, in the event of a failure of the compressed air supply system, it can enable a transfer of compressed air from the air suspension device to the toilet device and can operate the air suspension device as an emergency compressed air source. In this embodiment, the emergency compressed air source is thus formed by the air suspension device of the vehicle so that the toilet device can continue to be operated in the event of failure of the compressed air supply system without additional components or with only few additional components—compared with vehicles without the emergency compressed air source provided according to the invention.

The supply of the compressed air of the air suspension device to the toilet device is preferably carried out with the vehicle being lowered.

With respect to the compressed air supply system of the vehicle, it is considered to be advantageous for the vehicle to have a main air line which extends through the vehicle and which is connected both to the toilet device and to the air suspension device and which as an integral component of the compressed air supply system of the vehicle supplies both the toilet device and the air suspension device with compressed air during normal operation.

It is advantageous for there to be connected to the main air line a main compressor which during normal operation supplies the main air line with compressed air and for the main air line and the main compressor to form the compressed air supply system or at least components of the compressed air supply system of the vehicle.

A compressed air transfer from the air suspension device in the direction of the toilet device can be achieved in a particularly simple manner and with minimal use of components when the compressed air is directed from the air suspension device into the toilet device via the main air line. In order to enable such a transfer of compressed air, the control device is preferably connected to at least one valve, by means of which compressed air can be directed from the air suspension device into the toilet device via the main air line.

Alternatively, there may be provision for the air suspension device to be connected to the toilet device via at least one air line which is provided in addition to the main air line and for the control device to direct the compressed air from the air suspension device into the toilet device via the additional air line with the exclusion of the main air line. In this embodiment, therefore, the emergency supply of the toilet device is carried out in the event of failure of the compressed air supply system with the exclusion of the main air line or with the exclusion of the failed compressed air supply system. The advantage of the last variant mentioned is that continued operation of the toilet device by means of removal of compressed air from the air suspension device is also possible when the failure of the compressed air supply system can be attributed to a leakage of the main air line and a supply of compressed air from the air suspension device to the main air line would no longer enable continued operation of the toilet device.

Preferably, an emergency supply of the toilet device with compressed air is carried out only when it is necessary; for this reason, it is considered to be advantageous for the control device to be constructed in such a manner that it enables compressed air to be removed from the air suspension device in order to supply the toilet device only when the pressure in the main air line falls below a predetermined minimum pressure.

If the toilet device continues to be operated by means of removing compressed air from the air suspension device or by means of lowering the vehicle, it is considered to be advantageous for the control device to allow compressed air to be removed from the air suspension device only when the vehicle is stationary.

The vehicle may, for example, have multiple units and may form a train, in particular a railway train, which has a plurality of cars which are coupled to each other. In such a case, the control device may be associated with one of the cars of the train, a plurality of cars of the train or all the cars of the train. Preferably, the main air line extends through all the cars of the train.

The vehicle may alternatively or additionally have an auxiliary compressor as an emergency compressed air source.

Such an auxiliary compressor is preferably battery-operated in order to enable operation of the auxiliary compressor even in the event of failure of the central power supply of the vehicle.

The invention further relates to a method for operating a compressed-air-operated toilet device in a vehicle, in particular in a rail vehicle, wherein in the method for operating the toilet device compressed air is provided from a compressed air supply system.

According to the invention, there is provision with respect to such a method, in the event of a failure of the compressed air supply system, for compressed air to be provided for the continued operation of the toilet device with an emergency compressed air source.

With respect to the advantages of the method according to the invention, reference may be made to the above statements relating to the vehicle according to the invention since the advantages of the method according to the invention substantially correspond to those of the vehicle according to the invention.

It is considered to be particularly advantageous for the vehicle to be air-suspended by means of a compressed-air-operated air suspension device and, in the event of a failure of the compressed air supply system, for the toilet device to continue to be operated by compressed air being directed to the toilet device from the air suspension device with the vehicle being lowered.

BRIEF DESCRIPTION OF THE SEVERAL VIEWS OF THE DRAWING

The invention is explained in greater detail below with reference to embodiments; in the drawings, by way of example.

DESCRIPTION OF THE INVENTION

In the Figures, for the sake of clarity, the same reference numerals are always used for components which are identical or comparable.

Figure 1:
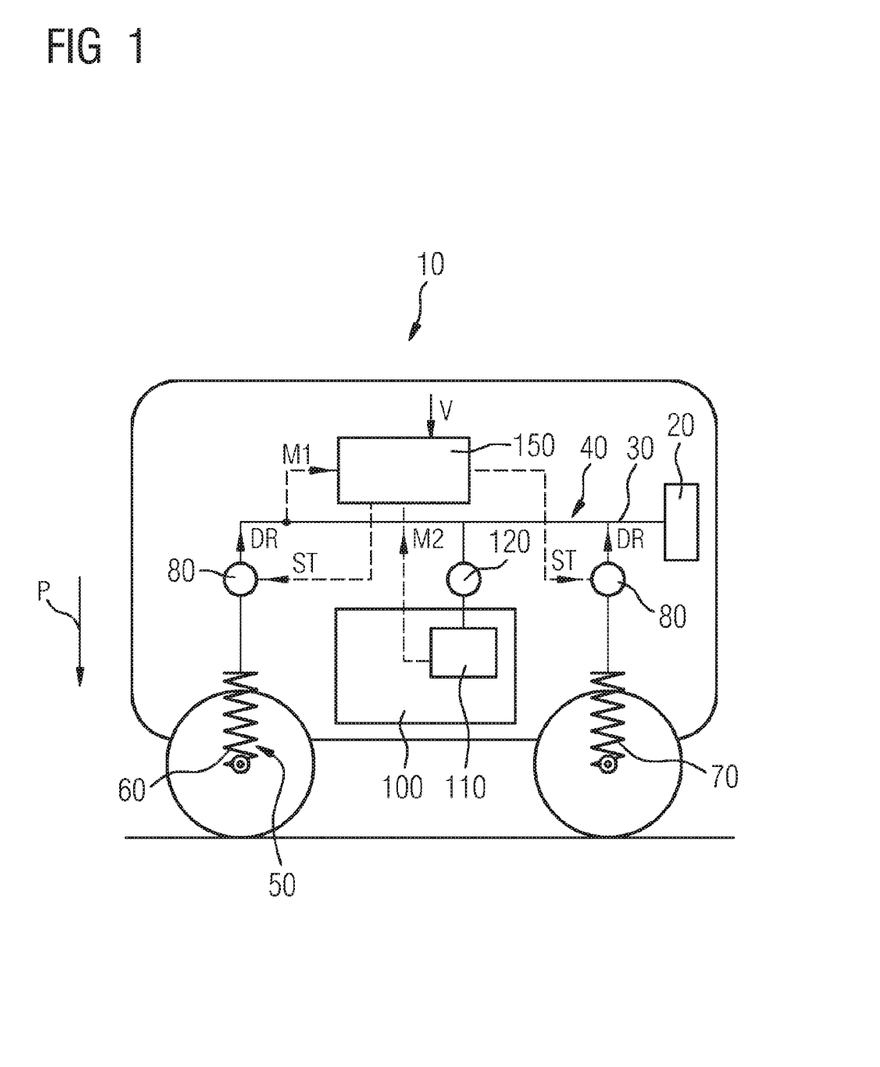
FIG. 1 is an embodiment of a rail vehicle according to the invention in which a toilet device is supplied with compressed air of a compressed air supply system, and in which in the event of failure of the compressed air supply system compressed air for the continued operation of the toilet device is removed from an air suspension device of the vehicle.

FIG. 1 shows an embodiment of a rail vehicle 10 which comprises a main compressor 20 and a main air line 30. The main air line 30 extends in the longitudinal direction of the rail vehicle 10 through the rail vehicle 10 and serves to supply compressed air to various components of the rail vehicle 10. The main compressor 20 and the main air line 30 form in the embodiment according to FIG. 1 a compressed air supply system 40 of the rail vehicle 10.

There is connected to the compressed air supply system 40 or the main air line 30 an air suspension device 50 of the rail vehicle 10, of which two pneumatic springs 60 and 70 can be seen in FIG. 1. The two pneumatic springs 60 and 70 are connected to the main air line 30 or the compressed air supply system 40 by means of valves 80 and are supplied with compressed air from the main compressor 20. The air suspension device 50 or the pneumatic springs 60 and 70 of the air suspension device 50 for the purposes of air suspension are mechanically connected to chassis, axles and/or wheels of the rail vehicle 10.

There is further connected to the compressed air supply system 40 or the main air line 30 a toilet device 100 which may have an internal compressed air container 110 for intermediate storage of compressed air. The toilet device 100 is connected to the main air line 30 by means of a valve 120 and is supplied with compressed air from the compressed air supply system 40.

The rail vehicle 10 according to FIG. 1 further has a control device 150 which monitors the compressed air supply system 40 and the toilet device 100. To this end, the control device 150 measures the pressure in the main air line 30 and the pressure in the compressed air container 110 of the toilet device 100; the corresponding pressure values are indicated in FIG. 1 with the reference numerals M1 and M2.

If the control device 150 determines that the pressure in the main air line 30 has fallen below a predetermined minimum pressure and also the pressure in the compressed air container 110 is too small for continued operation of the toilet device 100, that is to say, when the compressed air supply system 40 has failed and can no longer adequately supply the toilet device 100 with compressed air, it ensures continued operation of the toilet device 100 by operating the air suspension device 50 of the rail vehicle 10 as an emergency compressed air source.

In order to enable the operation of the air suspension device 50 as an emergency compressed air source for the toilet device 100, the control device 150 is connected to the two valves 80 via which the pneumatic springs 60 and 70 of the air suspension device 50 are connected to the main air line 30. By applying control signals ST, the control device 150 can open the two valves 80 and consequently bring about an air transfer from the pneumatic springs 60 and 70 or from the air suspension device 50 to the main air line 30. The compressed air DR will flow with the valves 80 open from the pneumatic springs 60 and 70 into the main air line 30 and from there via the valve 120 into the compressed air container 110. That is to say, the compressed air container 110 of the toilet device 100 is supplied with compressed air DR which is removed via the main air line 30 and the valves 80 from the air suspension device 50.

The removal of the compressed air DR from the two pneumatic springs 60 and 70 of the pneumatic spring device 50 leads to a lowering of the rail vehicle 10 which is indicated in FIG. 1 by means of an arrow with the reference numeral P.

In order also to prevent the rail vehicle 10 from being able to be lowered in the event of a failure of the compressed air supply system 40 when the rail vehicle 10 is traveling, the control device 150 is configured in such a manner that it permits lowering of the rail vehicle 10 or a removal of compressed air from the air suspension device 50 only when the rail vehicle 10 is stationary. In order to ensure such an operation of the control device 150, the control device 150 is preferably supplied with a measurement signal V which indicates the speed of the rail vehicle 10 or a stoppage of the rail vehicle.

Figure 2:
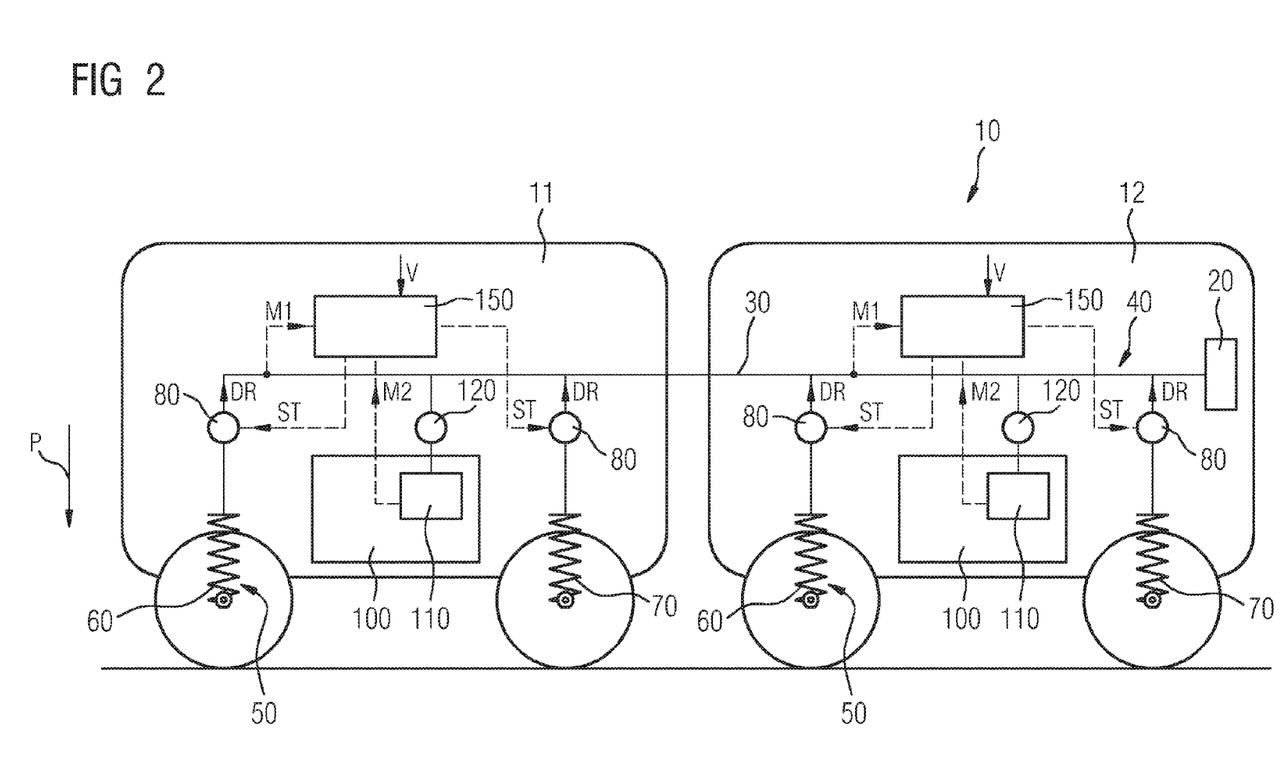
FIG. 2 is an embodiment of a rail vehicle, which has multiple units and which has a plurality of cars which are coupled to each other, wherein, in each of the cars in the event of failure of the compressed air supply system of the rail vehicle, the toilet devices are supplied with compressed air of the air suspension devices of the cars of the rail vehicle.

FIG. 2 shows an embodiment of a rail vehicle 10 which is formed by means of two cars 11 and 12 which are coupled to each other. A main air line 30 of a compressed air supply system 40 extends in the longitudinal direction of the rail vehicle 10 and supplies both the car 11 and the car 12 with compressed air.

There are connected to the compressed air supply system 40 toilet devices 100 which are supplied with the compressed air of the compressed air supply system 40. The air suspension devices 50 of the two cars 11 and 12 are also supplied with compressed air via the main air line 30; of the air suspension devices 50 of the two cars 11 and 12, FIG. 2 illustrates two pneumatic springs in greater detail and indicates them with the reference numerals 60 and 70 therein.

In the two cars 11 and 12 there is provided a respective control device 150 which monitors the air pressure in the main air line 30 and the air pressure in the compressed air container 110 of the respective toilet device 100.

If the control devices 150 determine that the pressure in the main air line 30 and the pressure in the compressed air containers 110 of the toilet devices 100 is too low, they transfer compressed air DR from the air suspension devices 50 of the two cars 11 and 12 to the toilet devices 100 as has already been explained in relation to FIG. 1. That is to say, the control devices 150 of the two cars 11 and 12 work, for example, precisely as has already been explained above in relation to the control device 150 according to FIG. 1. Consequently, the above statements in relation to FIG. 1 accordingly apply in the embodiment according to FIG. 2.

Figure 3:
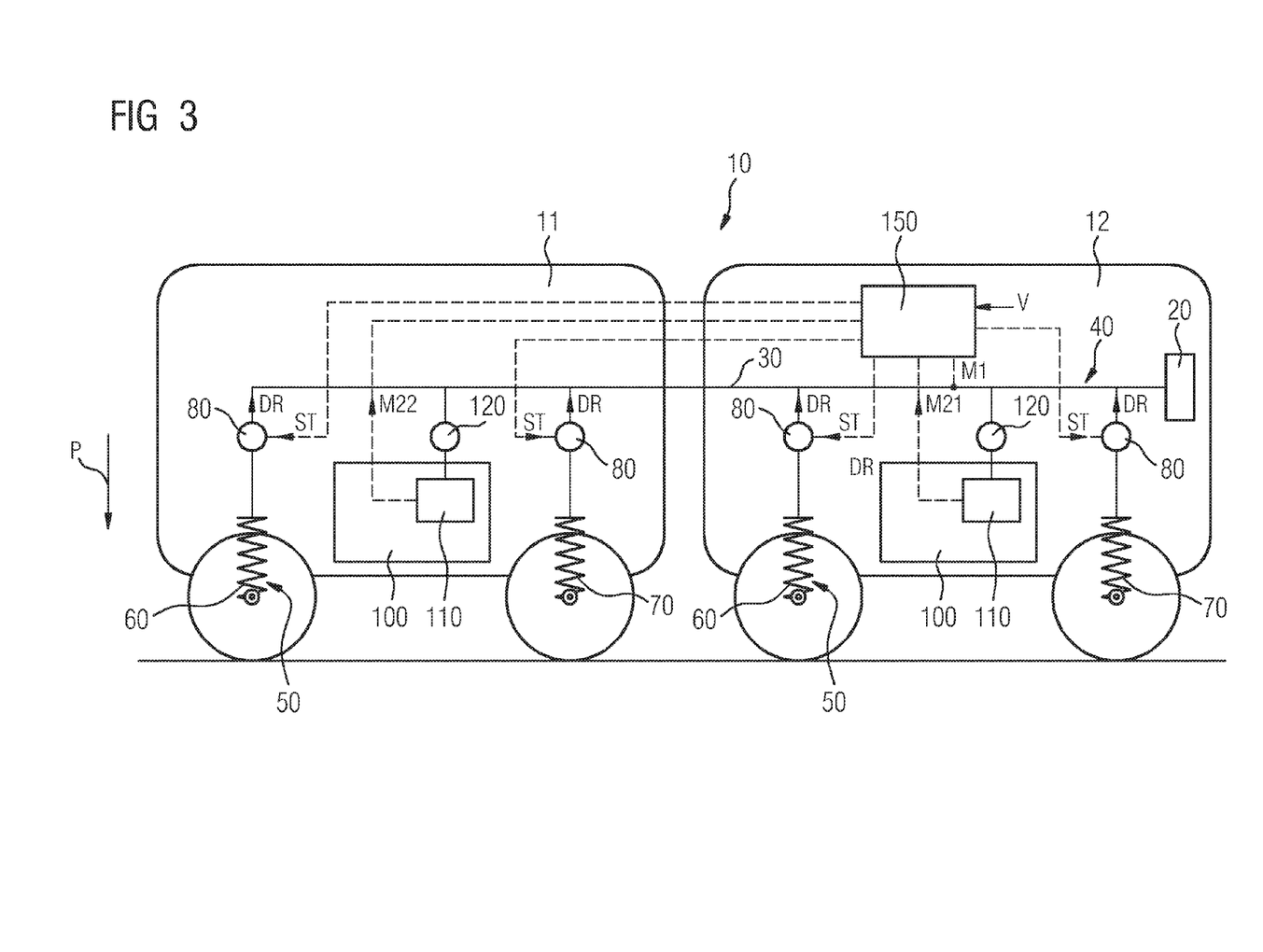
FIG. 3 is an embodiment of a rail vehicle which is formed by a large number of cars which are coupled to each other and in which a central control device in the event of failure of the compressed air supply system supplies the toilet devices with compressed air of the air suspension devices of the cars.

FIG. 3 shows an embodiment of a rail vehicle 10 which is formed by means of two cars 11 and 12 which are coupled to each other and corresponds to the embodiment according to FIG. 2 in this regard.

In contrast to the embodiment according to FIG. 2, in the rail vehicle 10 according to FIG. 3 there is provided only a single control device 150 which monitors the toilet devices 100 which are arranged in the cars 11 and 12 and which, in the event of a failure of a compressed air supply system 40 of the rail vehicle 10, enables continued operation of the toilet devices 100. The continued operation of the toilet devices 100 is carried out in the event of a failure of the compressed air supply system 40 by means of removal of compressed air DR from the air suspension devices 50 of the two cars 11 and 12, as has already been explained in greater detail in relation to the embodiments according to FIGS. 1 and 2.

In the event of a failure of the compressed air supply system 40, compressed air is removed from the air suspension devices 50, the cars 11 and 12 are lowered in the arrow direction P according to FIG. 3 and the toilet devices 100 are supplied with the compressed air DR of the air suspension devices 50.

Figure 4:
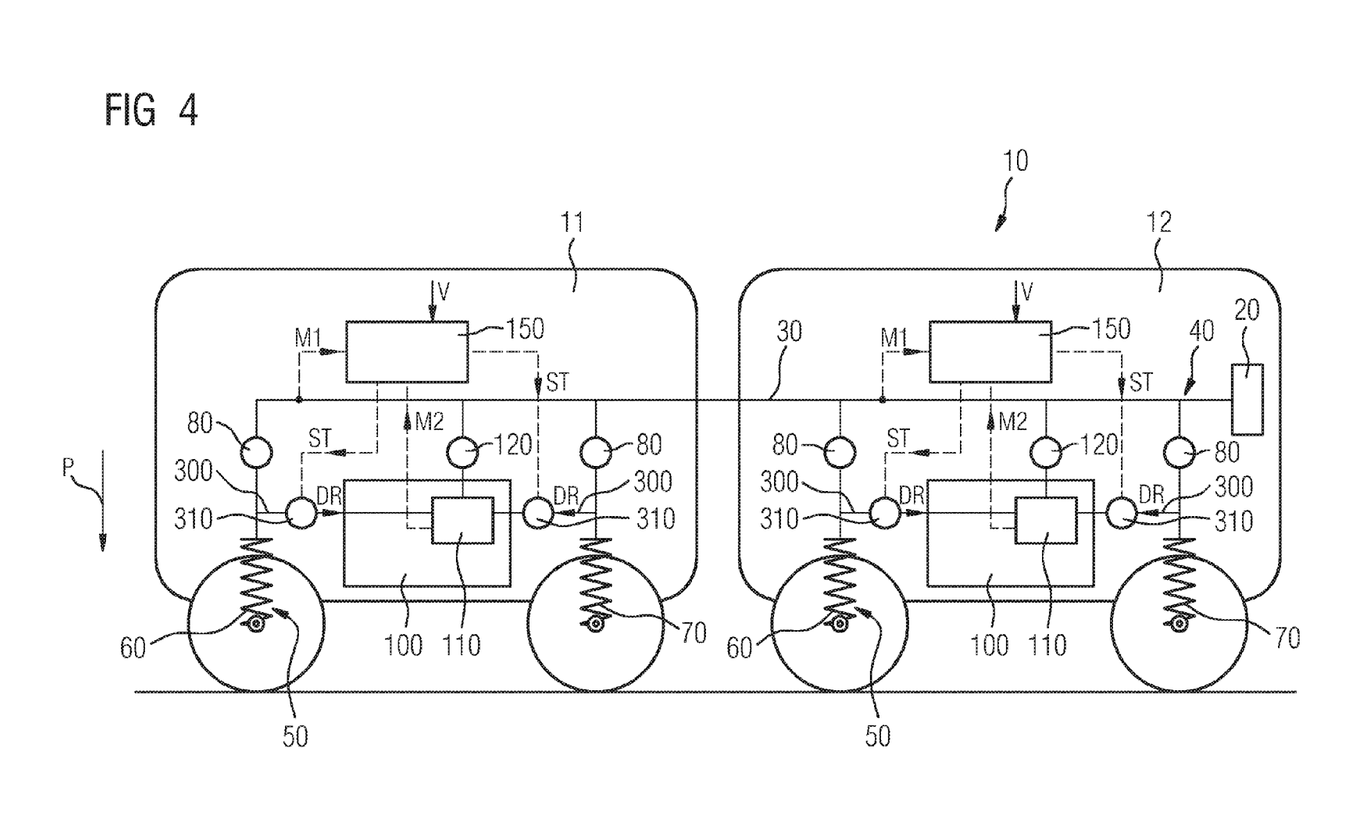
FIG. 4 is an embodiment of a rail vehicle according to the invention in which in the event of a failure of the compressed air supply system toilet devices are supplied by means of compressed air of the air suspension devices by the compressed air of the air suspension devices being directed directly into the toilet devices with a main air line being excluded.

FIG. 4 shows an embodiment of a rail vehicle 10 which is formed by means of two cars 11 and 12 which are coupled to each other and which are each provided with control devices 150. The embodiment according to FIG. 4 corresponds in this regard to the embodiment according to FIG. 2.

In contrast to the embodiment according to FIG. 2, in the rail vehicle 10 according to FIG. 4 there is provision in the event of a failure of the compressed air supply system 40 for a removal of compressed air from the air suspension devices 50 of the two cars 11 and 12 to be carried out by means of additional air lines 300 which enable direct transmission of compressed air DR from the pneumatic springs 60 and 70 of the air suspension devices 50 into the toilet devices 100. The control of the air flow from the air suspension devices 50 in the direction of the toilet devices 100 is carried out by means of valves 310 which are controlled by the control devices 150 by means of control signals ST.

In the event of a failure of the compressed air supply system 40 of the rail vehicle 10, this is determined by the control devices 150 since they monitor the pressure in the main air line 30 of the compressed air supply system 40. Furthermore, the control devices 150 can determine whether the pressure in the compressed air containers 110 of the toilet devices 100 is still sufficiently high for continued operation of the toilet devices.

If the control devices 150 determine that the residual pressure present in the compressed air containers 110 is too low for continued operation of the toilet devices 100, they can open the valves 310 and remove compressed air DR via the air lines 300 from the pneumatic springs 60 and 70 of the air suspension devices 50, fill the compressed air containers 110 with compressed air DR of the air suspension devices 50 and consequently enable continued operation of the toilet devices 100. The transfer of compressed air DR from the air suspension devices 50 to the toilet devices 100 is initiated by means of the control signals ST by means of which the control devices 150 determine the function of the valves 310.

In the embodiment according to FIG. 4, the transfer of compressed air DR from the air suspension devices 50 to the toilet devices 100 is consequently carried out with the main air line 30 being excluded or with the compressed air supply system 40 being excluded, that is to say, only by means of the additional air lines 300 which are independent of the main air line 30. It is consequently also possible to supply the toilet devices 100 with compressed air DR from the air suspension devices 50 when the main air line 30 is leaking and is the reason or one of the reasons for the failure of the compressed air supply system 40.

In the embodiment according to FIG. 4, a separate control device 150 is associated with each car; alternatively—as in the embodiment according to FIG. 3—there may be provided in the rail vehicle 10 only a single control device 150 which is associated with the toilet devices 100 of all the cars 11 and 12.

Figure 5:
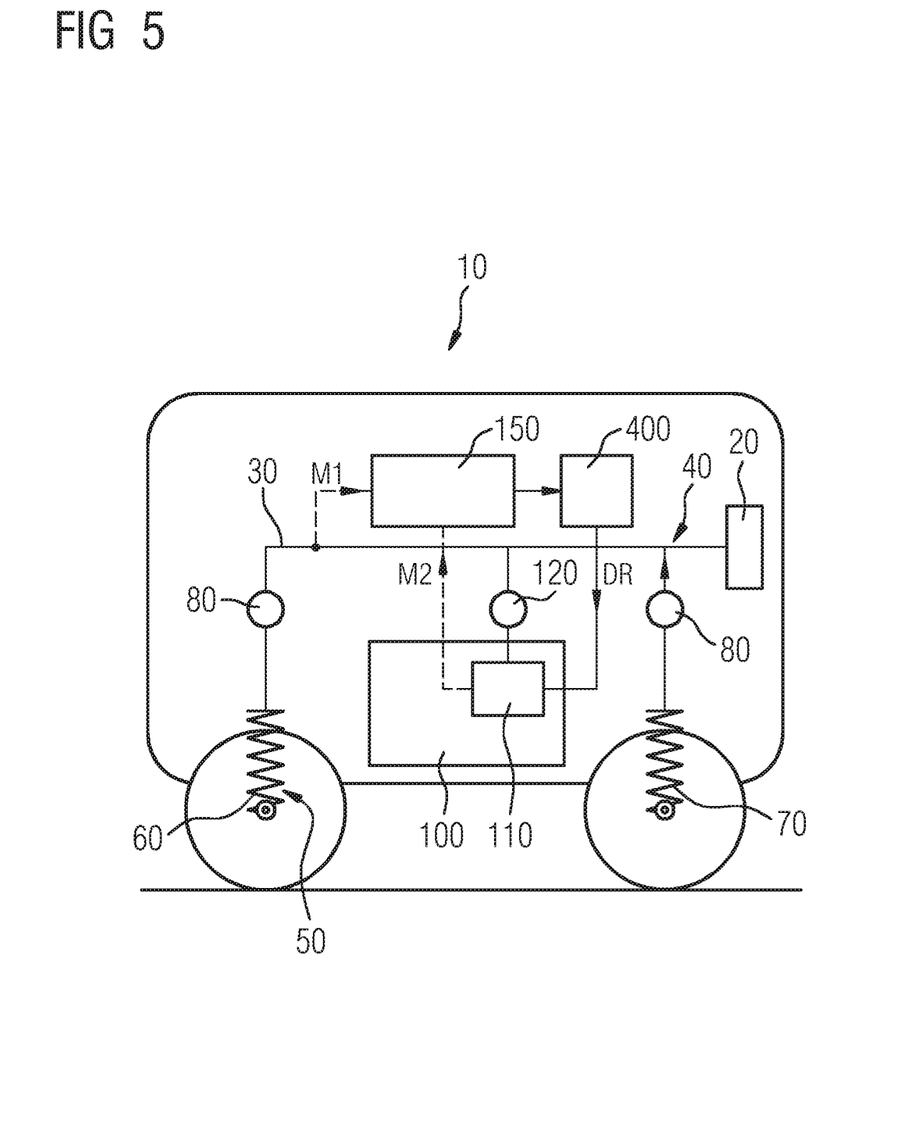
FIG. 5 is an embodiment of a rail vehicle according to the invention in which, in the event of a failure of the compressed air supply system, a battery-operated auxiliary compressor enables the continued operation of the toilet devices.

FIG. 5 shows an embodiment of a rail vehicle 10 in which a compressed air supply system 40 which comprises a main compressor 20 and a main air line 30 serves to supply compressed air to an air suspension device 50 of the rail vehicle 10 by means of valves 80. Furthermore, the compressed air supply system 40 supplies a toilet device 100 which is provided with an internal compressed air container 110. The supply of the toilet device 100 is carried out via a valve 120.

In order to ensure continued operation of the toilet device 100 in the event of a failure of the compressed air supply system 40, the rail vehicle 10 is provided with a control device 150. The control device 150 monitors the pressure in the main air line 30 and the pressure in the compressed air container 110 of the toilet device 100 by means of evaluation of corresponding measurement values M1 and M2 which are transmitted to the control device 150, and can consequently identify a failure of the compressed air supply system 40.

If the control device 150 determines that the compressed air supply system 40 has failed and continued operation of the toilet device 100 is not possible as a result of a lack of adequate pressure in the compressed air container 110, it will activate an auxiliary compressor 400 which is preferably battery-operated and using the auxiliary compressor 400 supply compressed air to the toilet device 100 or the compressed air container 110 of the toilet device 100. The compressed air which is supplied from the auxiliary compressor 400 is indicated in FIG. 5 with the reference numeral DR.

The embodiment according to FIG. 5 consequently differs from the embodiment according to FIG. 1 in that there is used as an emergency compressed air source for the continued operation of the toilet device 100 in the event of a failure of the compressed air supply system 40, not the air suspension device 50 of the rail vehicle 10, but instead the battery-operated auxiliary compressor 400.

Of course, it is possible to ensure continued operation of the toilet device 100 in the event of a failure of the compressed air supply system 40 both via removal of compressed air DR of the air suspension device 50 and by means of provision of additional compressed air DR by means of the auxiliary compressor 400. That is to say, it is thus possible in the event of a failure of the compressed air supply system 40 to provide two emergency compressed air sources, of which one is formed by the air suspension device 50 of the rail vehicle 10 and the other by the auxiliary compressor 400.

An emergency operation using auxiliary compressors, as explained in relation to FIG. 5, can also be used with rail vehicles with a plurality of cars, as shown in FIGS. 2 to 4. It is, for example, possible to provide each car with an auxiliary compressor; the control of the auxiliary compressors can be carried out in a decentralized manner by means of car-specific control devices or in a centralized manner by means of a single central control device.

Although the invention has been illustrated and described in detail by means of preferred embodiments, the invention is not limited by the disclosed examples and other variations can be derived therefrom by the person skilled in the art, without departing from the protective scope of the invention.

The invention claimed is:

1. A vehicle or rail vehicle, comprising:
a compressed-air-operated toilet device;
a compressed air supply system supplying said toilet device with compressed air during normal operation;
an air suspension device for providing air suspension of the vehicle, said air suspension device being connected indirectly or directly to said toilet device; and
a control device enabling a transfer of compressed air from said air suspension device to said toilet device and operating said air suspension device as an emergency compressed air source being suitable for providing compressed air for a continued operation of said toilet device in an event of a failure of said compressed air supply system.

2. The vehicle according to claim 1, wherein said control device supplies compressed air from said air suspension device to said toilet device causing the vehicle to be lowered in the event of the failure of said compressed air supply system.

3. The vehicle according to claim 1, which further comprises a main air line extending through the vehicle, being connected both to said toilet device and to said air suspension device and supplying both said toilet device and said air suspension device with compressed air during normal operation as an integral component of said compressed air supply system.

4. The vehicle according to claim 3, which further comprises a main compressor connected to said main air line, said main compressor supplying said main air line with compressed air during normal operation, and said main air line and said main compressor forming all of said compressed air supply system or at least components of said compressed air supply system.

5. The vehicle according to claim 3, which further comprises:
at least one additional air line provided in addition to said main air line, said at least one additional air line connecting said air suspension device to said toilet device;
said control device directing compressed air from said air suspension device through said at least one additional air line into said toilet device and excluding said main air line.

6. The vehicle according to claim 3, wherein said control device is configured to enable compressed air to be removed from said air suspension device in order to supply said toilet device only when a pressure in said main air line falls below a predetermined minimum pressure.

7. The vehicle according to claim 3, which further comprises multiple units of the vehicle forming a train or railway train having a plurality of cars being coupled to each other, said control device being associated with one of said cars of said train or with a plurality of said cars of said train or with all of said cars of said train.

8. The vehicle according to claim 7, wherein said main air line extends through all of said cars of said train.

9. The vehicle according to claim 1, which further comprises a main air line of said compressed air supply system, and at least one valve connected to said control device for directing compressed air from said air suspension device through said main air line into said toilet device.

10. The vehicle according to claim 1, wherein said control device allows compressed air to be removed from said air suspension device only when the vehicle is stationary.

11. The vehicle according to claim 1, wherein said emergency compressed air source is an auxiliary compressor.

12. The vehicle according to claim 11, wherein said auxiliary compressor is battery-operated.

13. A method for operating a compressed-air-operated toilet device in a vehicle or rail vehicle, the method comprising the following steps:
providing compressed air from a compressed air supply system for operating the toilet device during normal operation;
providing air suspension of the vehicle by using an air suspension device connected indirectly or directly to said toilet device; and
using a control device to enable a transfer of compressed air from the air suspension device to the toilet device and operating the air suspension device as an emergency compressed air source for a continued operation of the toilet device in an event of a failure of the compressed air supply system.

14. A method for operating a compressed-air-operated toilet device in a vehicle or rail vehicle, the method comprising the following steps:
 providing compressed air from a compressed air supply system for operating the toilet device;
 air-suspending the vehicle by using a compressed-air-operated air suspension device; and
 continuing to operate the toilet device in an event of a failure of the compressed air supply system by directing compressed air to the toilet device from the air suspension device as an emergency compressed air source while lowering the vehicle.

* * * * *